United States Patent
Porter

(10) Patent No.: US 6,551,540 B1
(45) Date of Patent: Apr. 22, 2003

(54) METHOD FOR OVERMOLDING SINK MARKS FOR AN AUTOMOTIVE COMPONENT

(75) Inventor: Marshall Ray Porter, Oakdale, IL (US)

(73) Assignee: Conix Corporation, Dearborn, MI (US)

(*) Notice: Subject to any disclaimer, the term of this patent is extended or adjusted under 35 U.S.C. 154(b) by 0 days.

(21) Appl. No.: 09/647,589

(22) PCT Filed: Apr. 12, 1999

(86) PCT No.: PCT/US99/07983

§ 371 (c)(1),
(2), (4) Date: Oct. 2, 2000

(87) PCT Pub. No.: WO99/52697

PCT Pub. Date: Oct. 21, 1999

Related U.S. Application Data

(60) Provisional application No. 60/081,462, filed on Apr. 13, 1998.

(51) Int. Cl.[7] .............................................. B29C 45/16
(52) U.S. Cl. ................. 264/255; 264/328.7; 264/328.8; 425/130; 425/542; 52/716.5; 293/102; 296/191
(58) Field of Search ........................... 264/328.7, 328.8, 264/255; 249/155, 158; 52/716.5; 293/102; 296/191; 425/130, 542

(56) References Cited

U.S. PATENT DOCUMENTS

| | | | | |
|---|---|---|---|---|
| 3,903,343 A | * | 9/1975 | Pfaff ........................... | 156/209 |
| 4,235,833 A | | 11/1980 | Arnason et al. | |
| 4,353,857 A | * | 10/1982 | Ray et al. .................... | 264/113 |
| 5,225,135 A | * | 7/1993 | Kia ............................ | 156/62.2 |
| 5,980,805 A | * | 11/1999 | Ohmura et al. ............. | 264/154 |
| 6,328,920 B1 | * | 12/2001 | Uchiyama et al. .......... | 264/255 |

* cited by examiner

Primary Examiner—Suzanne E. McDowell
(74) Attorney, Agent, or Firm—Banner & Witcoff, Ltd.

(57) ABSTRACT

A method, molding device and vehicle component (10) provide for minimized sink marks (30) caused by structural ribs (28) in the molding process. Molten material is injected into a first mold cavity to form a primary vehicle component part (20) having structural ribs (28) on a back side. Typically, sink marks (30) may develop at a front surface of the primary vehicle component part (20), located opposite to the structural ribs (28) on the back side. Molten material is injected into a second molding cavity that is arranged to overmold the front surface (26) of the primary vehicle component part (20) and to cover sink marks (30), if any, in the front surface (26). In this manner, a vehicle component (10) is manufactured with structural ribs (28) and without visible sink marks (30).

15 Claims, 2 Drawing Sheets

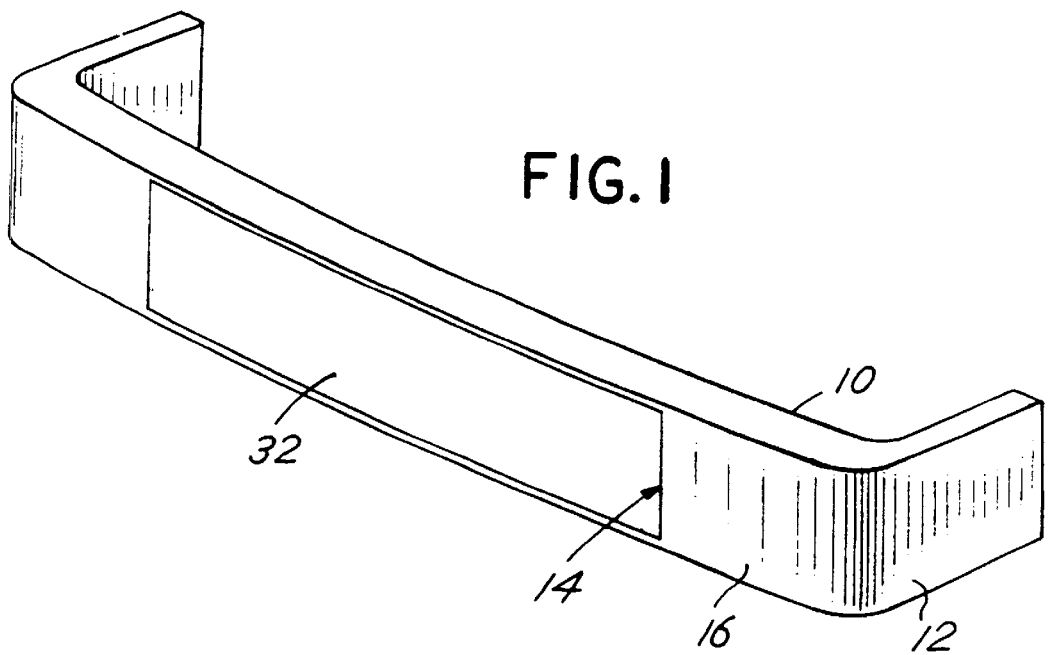
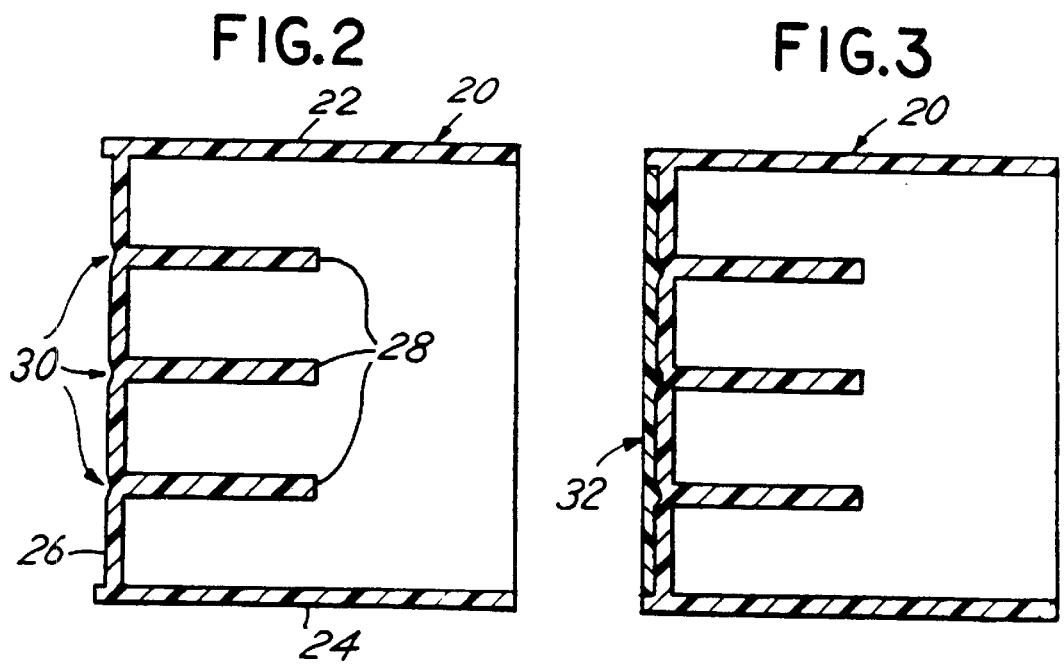

METHOD FOR OVERMOLDING SINK MARKS FOR AN AUTOMOTIVE COMPONENT

The present application claims priority under 35 U.S.C. §119 under the pending U.S. Provisional Patent Application Serial No. 60/081,462, Method for Overmolding Sink Marks for an Automotive Component, inventor Marshall Ray Porter, assigned to Conix Corporation, and filed on Apr. 13, 1998.

FIELD OF INVENTION

This invention relates to a method for manufacturing an automotive component such as a bumper beam, body panel or interior trim piece. In particular, this invention relates to a method for manufacturing an automotive component which has reinforcement ribs on the back side and a visibly smooth front or outer surface.

BACKGROUND OF THE INVENTION

Many automotive components are manufactured with structural ribs on the back side. Examples of such parts include decorative bumpers, body panels and interior trim pieces. When structural ribs are molded onto the back side of a part, it is common that the front surface will develop depressions or sink marks at the rib locations. On a visible or class A surface, sink marks are highly undesirable.

It is possible to mold a part to avoid sink marks. The thickness of the rib structures is reduced to minimize sink marks. However, additional brackets or parts are required in order to improve the strength of the part.

Alternatively, the sink marks can be covered by other parts. For example, a facia is used to cover a bumper beam. The facia will have small ribs in order to prevent sink marks and will cover the bumper beam which will have sink marks.

SUMMARY OF THE INVENTION

The disadvantages of the prior art may be overcome by providing a method for manufacturing an automotive component, such as a bumper beam, body panel or interior trim piece, with structural ribs and without visible sink marks.

According to one aspect of the invention, there is provided a mold, comprising of mold halves wherein at least one mold half has at least one section which is movable between a first injection position and an expanded second injection position. At the first stage, the mold halves are closed and the section is in the first injection position to present a first cavity for forming a primary part having structural ribs on the back side. Molten material is injected into the first cavity. The section is then retracted from the first injection position to the expanded second injection position defining a second cavity between the molded primary part and the section. Molten material is injected into the second cavity to overmold the front surface of the part covering any sink marks which may have developed during the first injection step. Once the part is sufficiently solidified, the mold is opened and then the part is ejected.

DESCRIPTION OF THE DRAWINGS

In drawings which illustrate an embodiment of the invention,

FIG. 1 is a perspective view of an automotive part manufactured by the present invention;

FIG. 2 is sectional view of the automotive part of FIG. 1, the automotive part in a preliminary stage of manufacture;

FIG. 3 is a sectional view of the automotive part of FIG. 1, the automotive part in a final stage of manufacture.

DESCRIPTION OF THE INVENTION

Figure 4:
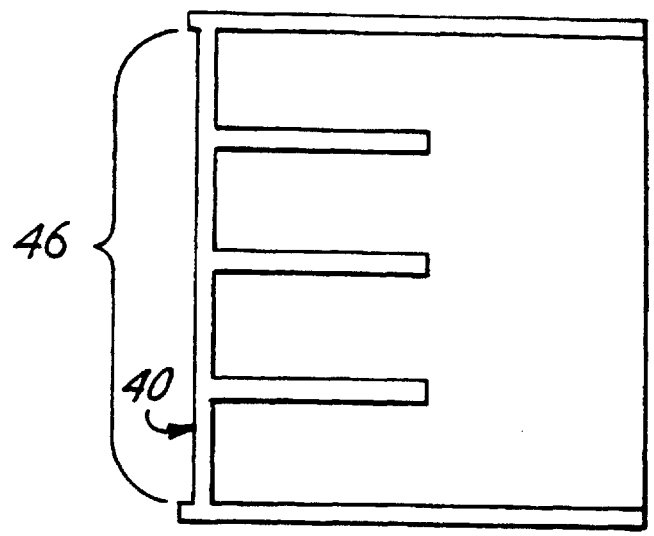
FIG. 4 is a sectional view of the molding device wherein the retractable section is in the first injection position to form the first cavity.

An automotive component such as a bumper beam 10 molded according to the present invention is illustrated in FIG. 1. The outer surface 12 of the bumper beam 10 is the visible or class A surface which requires a visibly smooth surface. The outline 14 is the parting line between the primary injection and the secondary injection. It is readily understood that the outline 14 can be expanded such that it covers the entire front face 16 of the bumper beam 10. Alternatively, the outline 14 can be masked by shaping the outline 14 to match a decorative design.

In the first or primary stage, the bumper beam 10 is first injection molded in a conventional molding process to produce a primary part 20. Primary part 20 has a upper wall 22, lower wall 24, front face 26 and structural ribs 28. The primary part 20, including structural ribs 28 and front face 26, is of sufficient thickness to meet government mandated bumper impact tests such as FMVSS Title 49, part 581. Due to the thickness of the ribs 28 and front face 26, sink marks 30 will develop on the front face 26.

In the secondary stage, the mold section which defines front face 26 has a construction which allows at least a portion to be retracted to define a secondary cavity between the front face 26 and the mold surface. A secondary molding process injects material 32 into the secondary cavity to overmold the front face 26. The material 32 will solidify in a uniform manner and will cover the sink marks 30 presenting a visibly smooth or class A surface.

Figure 5:
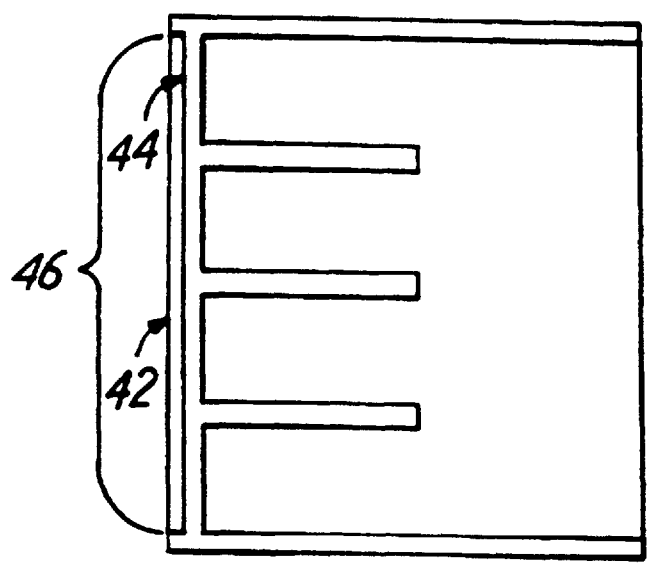
FIG. 5 is a sectional view of the molding device wherein the retractable section is in the expanded second injection position to form the second cavity.

A mold incorporating the present invention is constructed and arranged to have mold halves which cooperate together to form a primary mold cavity. At least one of the mold halves has at least one section which is movable between a first injection position and an expanded second injection position. At the first stage, as shown in FIG. 4, the mold halves are closed and the section 46 is in the first injection position 40 to present a first cavity for forming a primary part 20 having structural ribs 28 on the back side. Molten material is injected into the first cavity. As shown in FIG. 5, the section 46 is then retracted from the first injection position 40 to the expanded second injection position 42 defining a second cavity between the front surface 44 of the molded primary part and the section 46. Molten material 32 is injected into the second cavity to overmold the front surface 44 of the part covering any sink marks which may have developed during the first injection step. Once the part 10 is sufficiently solidified, the mold is opened and then the part 10 is ejected.

In the illustrated embodiment, the material 32 is injected into the secondary cavity primarily defined by the primary part 20. In other words, front face 26 is recessed from the forward edges of upper wall 22 and lower wall 24. It readily understood that front face 26 could be flush with the upper wall 22 and lower wall 24 to move the upper and lower parting line of outline 14 onto the upper wall 22 and lower wall 24 rather than the front face.

Preferably, the primary injection material is the same as the secondary injection material. Suitable materials include polycarbonate and polypropylene. The injection material should be selected and the process carried out such that the secondary injection material will fully bond with the primary injection material.

The above-described embodiment of the invention is intended to be an example of the present invention and alterations and modifications may be effected thereto, by those of skill in the art, without departing from the scope of the invention.

What is claimed is:

1. A method for molding a vehicle component, comprising the steps of:
    injecting molten material into a first molding cavity of a mold, wherein the mold has a section that is moveable between a first injection position and an expanded second injection position to utilize the first injection position, to form a primary vehicle component part having structural ribs on a back side;
    moving the section to the expanded second injection position; and
    injecting molten material into a second molding cavity to overmold a front surface of the primary vehicle component part and to cover sink marks, if any, in the front surface, and maintaining the shape of the second molding cavity until the injected molten material overmolds the front surface.

2. The method of claim 1 wherein the vehicle component is one of: a vehicle bumper, a body panel and an interior trim piece.

3. The method of claim 2 wherein the vehicle bumper is one of: an automotive bumper, a truck bumper, a van bumper and a sport utility bumper.

4. The method of claim 2 wherein the body panel is one of: an automotive body panel, a truck body panel, a van body panel and a sport utility body panel.

5. The method of claim 2 wherein the interior trim piece is one of: an automotive interior trim piece, a truck interior trim piece, a van interior trim piece and a sport utility interior trim piece.

6. A molding device that minimizes sink marks for a vehicle component that has structural ribs, comprising:
    a first mold portion having at least one section that is movable between a first injection position and an expanded second injection position; and
    a second mold portion arranged to form a first cavity when the section is in the first injection position and a second cavity when the section is in the expanded second injection position;
    wherein, when the section is in the first injection position, the first cavity is configured to form a primary vehicle part having structural ribs on a back side; and when the section is in the expanded second injection position, the second cavity is formed between the primary vehicle part and the section, and the shape of the second molding cavity is maintained until molten material is injected into the second molding cavity and overmolds a front surface of the primary vehicle part.

7. The molding device of claim 6 wherein the vehicle component is one of: a vehicle bumper, a body panel and an interior trim piece.

8. The molding device of claim 7 wherein the vehicle bumper is one of: an automotive bumper, a truck bumper, a van bumper and a sport utility bumper.

9. The molding device of claim 7 wherein the body panel is one of: an automotive body panel, a truck body panel, a van body panel and a sport utility body panel.

10. The molding device of claim 7 wherein the interior trim piece is one of: an automotive interior trim piece, a truck interior trim piece, a van interior trim piece and a sport utility interior trim piece.

11. A vehicle component formed with minimized sink marks caused by structural ribs, comprising:
    a primary vehicle component part having structural ribs on a back side, wherein the primary vehicle component part is formed by injecting molten material into a first molding cavity wherein sink marks may be formed on a front surface of the primary vehicle component part; and
    an overmolded vehicle component part is formed by injecting molten material into a second molding cavity that is arranged to overmold the front surface of the primary vehicle component part and to cover sink marks, if any, in the front surface, and maintaining the shape of the second molding cavity until the injected molten material overmolds the front surface.

12. The vehicle component of claim 11 wherein the vehicle component is one of: a vehicle bumper, a body panel and an interior trim piece.

13. The vehicle component of claim 12 wherein the vehicle bumper is one of: an automotive bumper, a truck bumper, a van bumper and a sport utility bumper.

14. The vehicle component of claim 12 wherein the body panel is one of: an automotive body panel, a truck body panel, a van body panel and a sport utility body panel.

15. The vehicle component of claim 12 wherein the interior trim piece is one of: an automotive interior trim piece, a truck interior trim piece, a van interior trim piece and a sport utility interior trim piece.

* * * * *